INVENTORS
NILS SCHUMMER
GERT PERNAUX

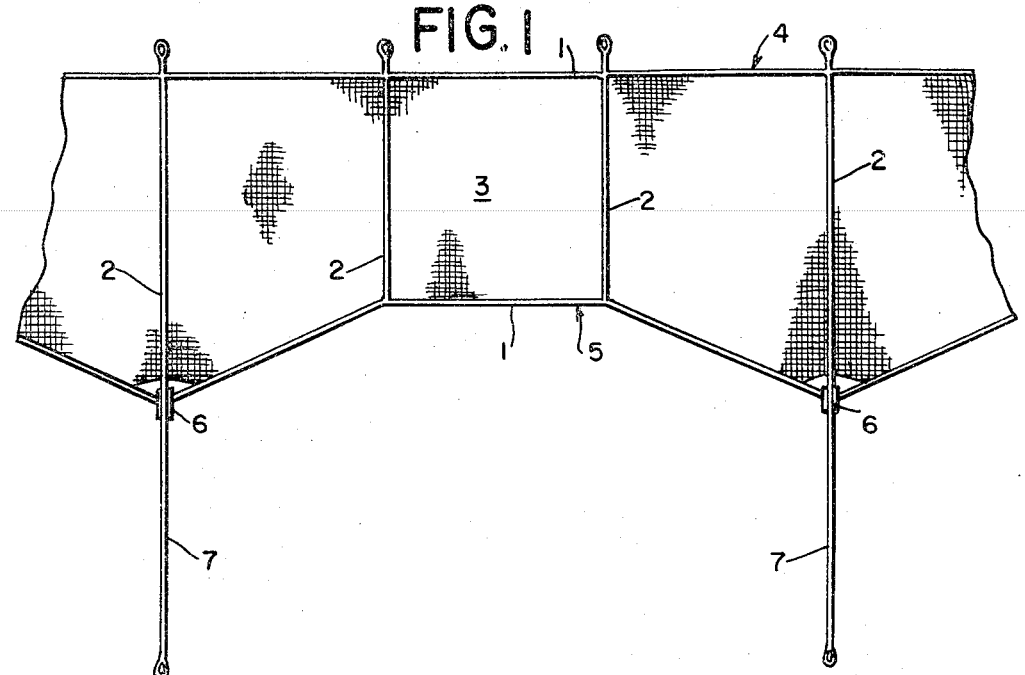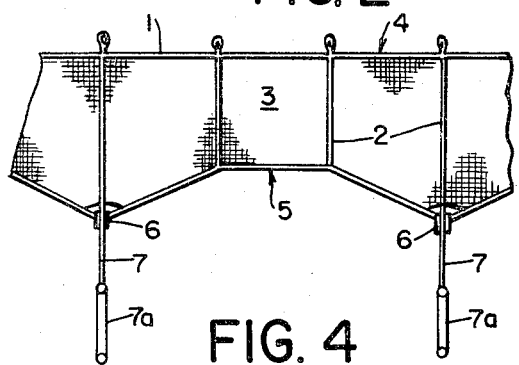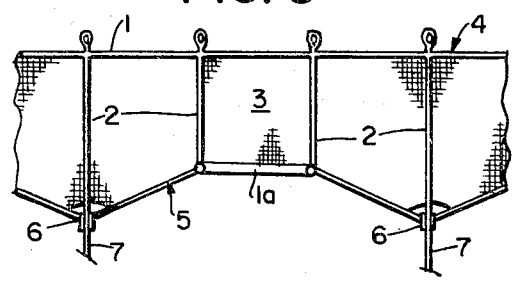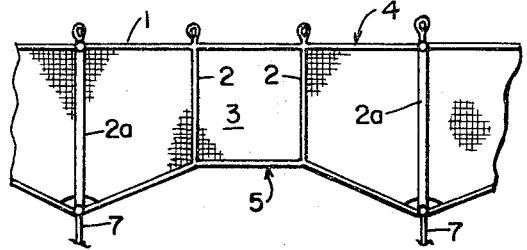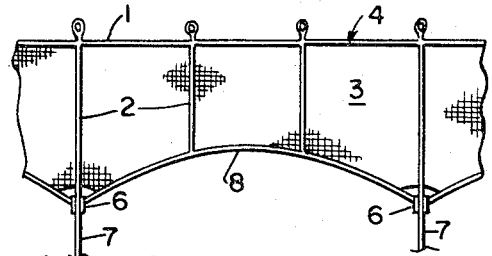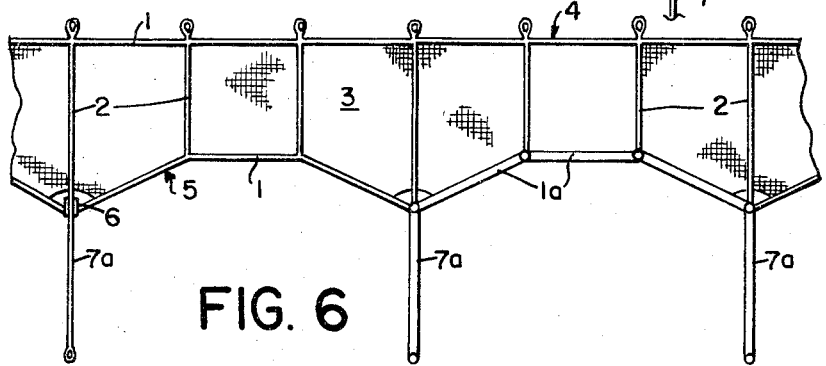

United States Patent Office 3,520,266
Patented July 14, 1970

3,520,266
DETACHABLE LONGITUDINAL BULKHEAD FOR SHIPS
Nils Schummer and Gert Pernaux, Warnemunde, Germany, assignors to VEB Warnowwerft Warnemunde, Warnemunde, Germany
Filed Sept. 16, 1968, Ser. No. 762,263
Int. Cl. B63b 25/08
U.S. Cl. 114—75
7 Claims

ABSTRACT OF THE DISCLOSURE

A detachable longitudinal bulkhead for bulk goods especially grain, for use in ships and made of a flexible material, in which the lower marginal portion has a non-linear contour, such as polygonal or arcuate, and in which the bottom supports are provided only at the lowermost points of the non-linear lower marginal portion, for connection with a ship, and in which at least parts of the marginal portions, and/or vertical bands, and/or supports are made of a material having a high degree of elasticity, such as rubber or polyamide.

BACKGROUND OF THE INVENTION

Field of the invention

The present invention relates to a detachable longitudinal bulkhead for ships for receiving bulk goods and made of flexible material. The invention also relates to the base structure for such longitudinal bulkhead and the suspension or support thereof. The bulkhead is particularly adapted for use with ships for carrying grain in order to prevent the load of grain from going overboard.

If the cargo hold or body of a ship is to be filled completely with grain or other bulk goods, it is necessary to equip the upper third of the height of the hold or body with longitudinal bulkheads for grain or bulk goods.

Prior art

For this purpose, aside from conventional stiff or solid bulkheads consisting of supports and planks, detachable longitudinal bulkheads for bulk goods have become known which are equipped with rods or bars connecting the bulkhead with the hold of the ship's body in which the wall of the bulkhead is made of flexible material and in which steel or wire bands are inserted at the top and bottom edge thereof. In vertical position, these longitudinal bulkheads are connected to displaceable bars of the hedgeway, laterally confined by reinforcements, and fixed at the lower edge thereof by means of wire or rope suspensions.

Furthermore, detachable longitudinal bulkheads for bulk goods and made of flexible material have become known, the base structure of which consists of a suitable number of wire ropes extending vertically and horizontally between the upper and lower space confinements. In this instance, the material of the wall of the bulkhead is arranged on this base structure on both sides and is connected with the latter, while the upper and lower horizontally extending wire ropes form the upper and lower edge respectively of the bulkhead and while the vertical wire ropes are extended below the bulkhead as supports of steel wire or profile to the lower portion of the confinement of the ship hold.

In each of the above described cases, it is intended to transfer the specific surface pressure or load exerted on the flexible bulkhead wall material by the bulk goods onto a base structure of steel wire or bands forming rectangular areas or fields and to transmit the load as tension or pulling forces onto the connecting points at the deck, bulkhead and bottom of the ship's hold.

The above described structures are very expensive as far as their manufacture and also their assembly is concerned since the distance between the vertical ropes or wires have to be held small in order to be able to use a light flexible wall material and since for each vertical wire rope between the upper and lowed edge of the bulkhead a lower force transmitting means via the above-mentioned suspensions or supports to the outer skin of the ship or to the bottom is required.

This arrangement results in that, in view of the connection of the supports with the vertical wires or ropes of the bulkhead, connecting points have to be provided which interrupt the smooth and continuous flexible wall material at the lower edge of the bulkhead at many points and thereby create easily the possibility of damaging the wall material. Furthermore, the entire arrangement is very unfavorable as far as its weight or mass and its manueverability is concerned in view of the many required supports, since each individual support has to be attached by hand during the assembly on board the ship. In view of the large number of supports, also the expense for the necessary servicing and attention to corrosion is very high.

A further disadvantage consists in that during the manufacture of the base structure, as well as of the support or suspension, the longitudinal measurements have to be observed strictly in accordance with the specific circumstances under which the bulkhead is to be provided in the ship's hold. In view of the well known fact that the tolerances observed and achieved during the building of the ship are not known in advance, prior to the manufacture of the base structure and the supports the exact measurements, as for instance the longitudinal extensions and the heights, have to be measured aboard, i.e., they cannot be determined from production drawings, and the preset or predetermined length of the structural members have to be corrected where necessary in order to assure that the base structure and the supports receive only forces of a predetermined magnitude and transmit only permissible forces to the connecting points at the ship's hull. This is particularly important in order to avoid unusually high forces which can cause the entire arrangement to break down.

As will be evident from the above, longitudinal bulkheads for ship holds theoretically having the same measurements for one or a number of ships cannot be exchangeably or selectively used under all circumstances. The obvious solution of employing connecting elements that can be adjusted with respect to each other, has not proved to be a satisfactory solution.

SUMMARY OF THE INVENTION

It is, therefore, an object of the present invention to provide a detachable longitudinal bulkhead for bulk goods made of flexible material, which is simple in construction, which can be easily handled and which requires little maintenance.

It is another object of the present invention to provide a longitudinal bulkhead as referred to above, which makes it possible to compensate for tolerances, and variations between different ships so that one and the same bulkhead may be used exchangeably and interchangeably for ship holds of various dimensions and measurements.

More specifically, it is an object of the present invention to provide a detachable longitudinal bulkhead for bulk goods of flexible material, with a base structure which permits a reduction in the weight of the bulkhead in view of a very practical and useful design of the lower edge of the bulkhead and the lower horizontal wire of the base structure.

Also, it is an object of the present invention to provide a base structure for the longitudinal bulkhead which requires that the suspensions or supports for the bulkhead are connected at only some of the vertical ropes of the base structure.

Still furthermore, it is an object of the present invention to provide a detachable longitudinal bulkhead for bulk goods, in which the base structure and supports are designed in such a way that deviations in the height and length of the bulkhead in view of tolerances and variations in the measurements of the ship remain without detrimental effect on the predetermined forces or deflections caused by the load in the bulkhead.

In accordance with the present invention longitudinal bulkhead for bulk goods, made of flexible material is characterized primarily in that the lower marginal portion thereof, in combination with the lower horizontally directed rope or band extends non-linearly, e.g. polygonally or arcuately, over the region of several vertical ropes or bands, and in that the bottom supports for fixing the position of the bulkhead are provided only at the lowermost portions of the lower marginal portion, whereby all or only some portions of the ropes or bands of the base structure as well as the supports may be made wholly or partly of a material of large elasticity, for instance rubber or polyamide.

The invention is illustrated by way of example in the attached drawing, in which:

FIG. 1 is a side view of a bulkhead designed in accordance with the present invention;

FIGS. 2 to 7 show various modifications of the bulk head according to FIG. 1.

DETAILED DESCRIPTION OF THE PREFERRED EMBODIMENT

Figure 7:
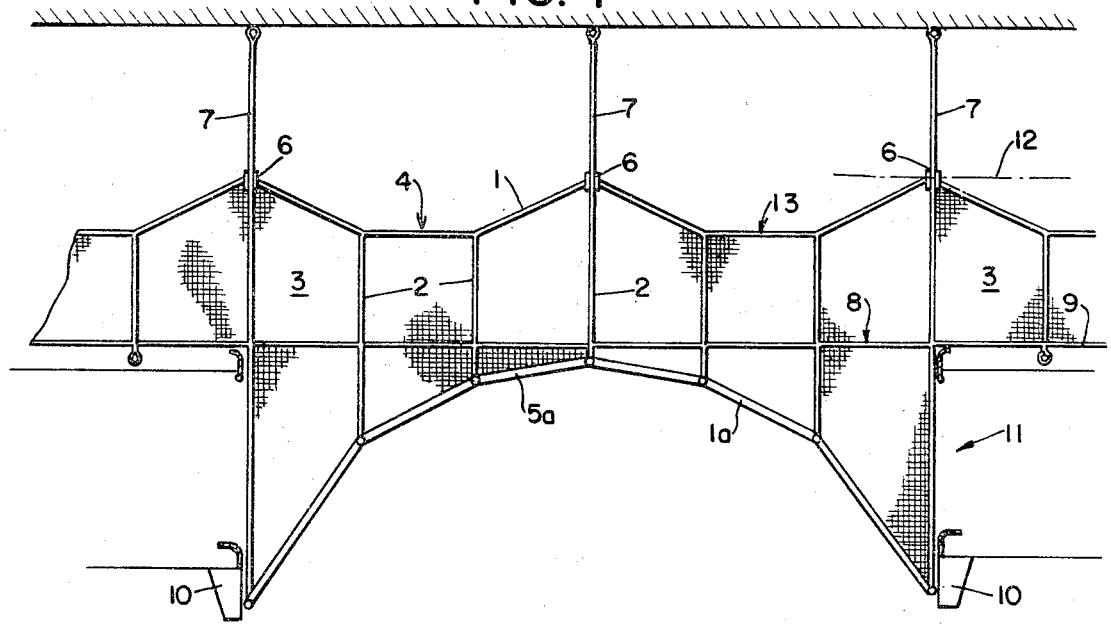
Figure 8:
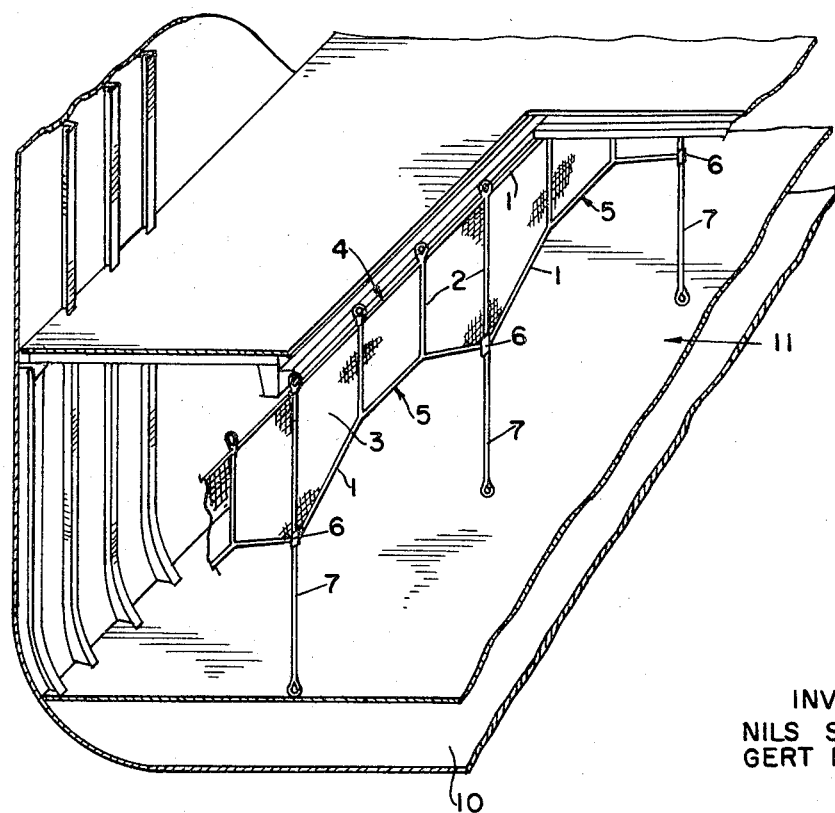
FIG. 8 is a perspective view of the bulkhead of FIG. 1 as connected to the body of a ship.

Referring now to FIG. 1 of the drawing, horizontal ropes or bands 1 and vertical ropes or bands 2 form with base structure between the upper marginal portion 4 and the lower marginal portion 5 of the detachable longitudinal bulkhead 3 for bulk goods. Bulkhead 3, which is made as a wall of flexible material, is suspended between the front and rear end of a ship's hold (not shown) and from the top or hatch coaming of the ship's hold. For fixing the proper position of bulkhead 3, the lowermost portions 6 of the polygonally extending lower margin 5 of the bulkhead 3 are supported or tensioned by supports 7 to the bottom or to the sides of the ship's hold.

It is within the purview of the invention to make several modifications of the design of FIG. 1. Thus, for example, the vertical ropes or bands may be designed as inserts within the range of the supports 7 or the wall material may extend only up to a lower margin 8 of an additional horizontal rope 9 extending directly above the polygonally extending lower margin 5a of the bulkhead (FIG. 7).

According to another modification, an elastic base structure and elastic supports and non-linear, e.g. polygonally or arcuate lower marginal portions or horizontal bands or ropes can be used independently of each other. Also, the invention is not to be considered limited to the lower marginal portion of longitudinal bulkheads for bulk goods but can also be employed with such longitudinal bulkheads which extend from the bottom 10 of the ship's hold 11 to a certain height 12, or for the upper marginal portion 13 of the bulkhead rather than to the lower marginal portion only thereof (FIG. 7). The invention is also applicable to walls of charging chutes.

Some of these modifications are shown in FIGS. 2 to 6. In these figures, the reference character *a* indicates that the particular element is made of a highly elastic material. For example, 1*a* represents a horizontal flexible band or wire, 2*a* a flexible vertical band or wire, 7*a* a flexible support.

More particularly, with reference to FIGS. 2 to 7, FIG. 2 shows a bulkhead in which a portion 7*a* only of each support 7 is made of an elastic material. In FIG. 3, only one of the horizontal bands of the lower marginal portion 5 is made of a highly elasitc material, whereas in FIG. 4 two of the vertical bands, designated 7*a*, are made of highly elastic material, such as rubber or polyamide.

According to FIG. 5, the lower marginal portion 8 is arcuate rather than polygonal. In FIG. 6, only a portion of the entire lower marginal portion and supports is made of highly elastic material.

The bulkhead according to the present invention makes it possible to eliminate more than half of the previously necessary supports 7 so that the entire arrangement will be considerably less complicated, lighter and simpler and can be handled much easier while the time required for assembly or disassembly or detachment of the longitudinal bulkhead is likewise considerably reduced. Furthermore, it is possible to reduce considerably the requirements as to tolerances during the manufacture of the bulkhead and of the supports and to the accuracy of the dimensions since the deviations as well as the usual tolerances in ship building are small compared to the inherent elasticity of the entire longitudinal bulkhead or individual parts thereof in response to a load. This in turn makes it possible to utilize one and the same bulkhead for several ship holds with approximately the same dimensions. The reduction in the number of parts as well as the selection of a suitable material also lead to a reduction in the required maintenance for the bulkhead.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What is claimed is:

1. A detachable longitudinal bulkhead wall for bulk goods, for use in ships and made of flexible material, which comprises: a lower and an upper horizontally directed marginal portion of elastic material, at least one of said portions having a non-linear contour, a plurality of vertical bands of elastic material, said vertical bands extending between the upper and lower marginal portions, and support means connected at only some of said bands to the extreme points only of said non-linear marginal portions, for connecting with portions of a ship.

2. A bulkhead according to claim 1, wherein at least portions of said support means are made of a material having a high elasticity.

3. A bulkhead according to claim 1, wherein at least portions of said marginal portions are made of a material having a high degree of elasticity.

4. A bulkhead according to claim 1, wherein at least portions of said vertical bands are made of a material having a high degree of elasticity.

5. A bulkhead according to claim 1, wherein said non-linear contour has a polygonal shape.

6. A bulkhead according to claim 1, wherein said non-linear contour has an arcuate shape.

7. A bulkhead according to claim 1, wherein said one marginal portion is the lower marginal portion, whereas said upper marginal portion has a linear horizontally directed contour.

References Cited

UNITED STATES PATENTS

| | | | |
|---|---|---|---|
| 2,669,402 | 2/1954 | Del Mar | 114—75 X |
| 3,099,313 | 7/1963 | Peck et al. | 114—75 X |
| 3,310,016 | 3/1967 | Lopker | 114—75 |

TRYGVE M. BLIX, Primary Examiner